No. 768,792. Patented August 30, 1904.

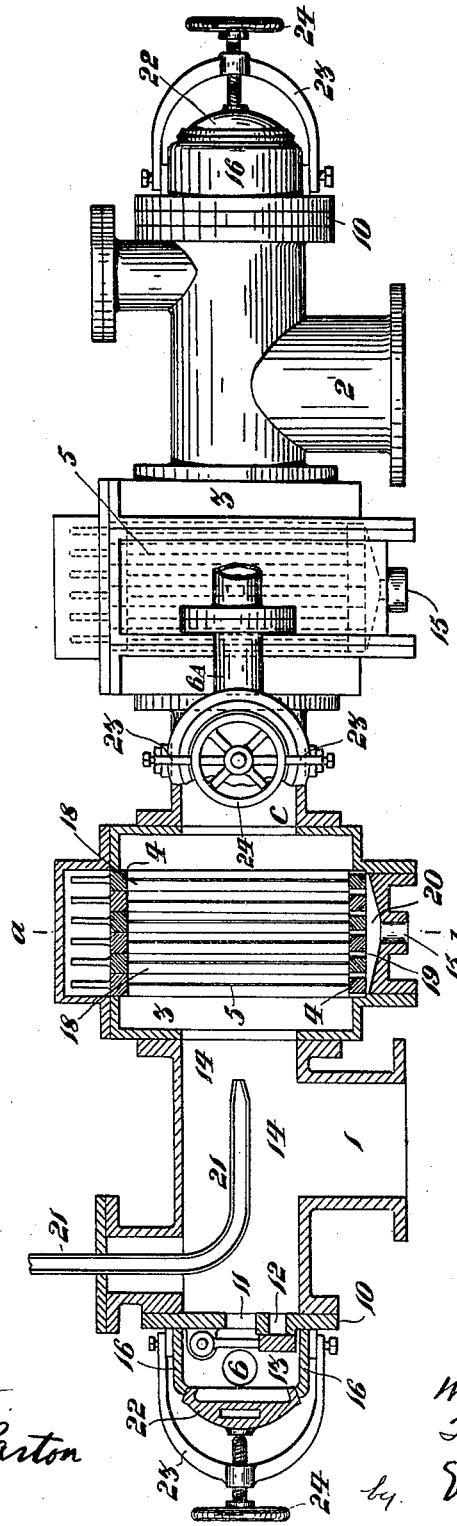

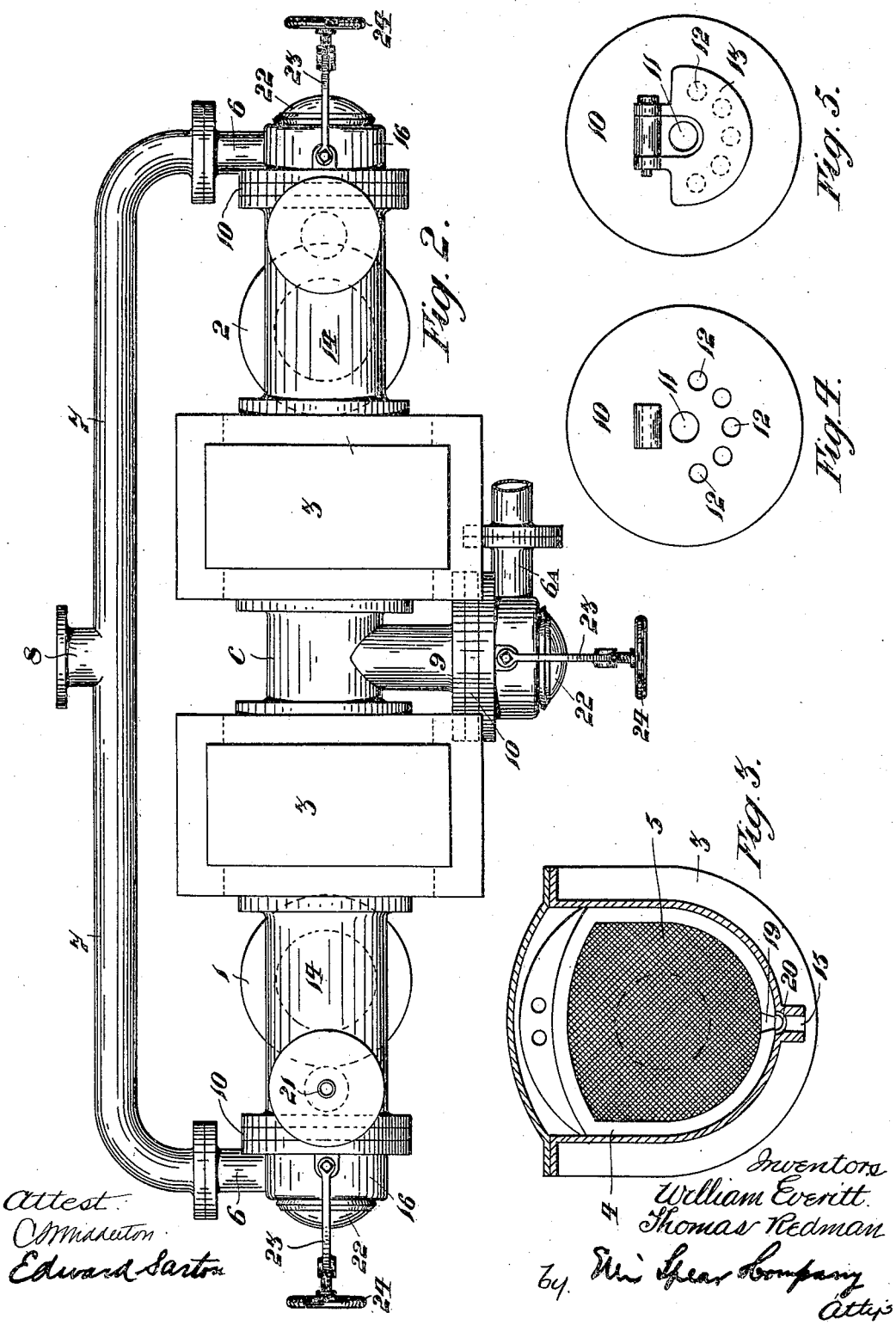

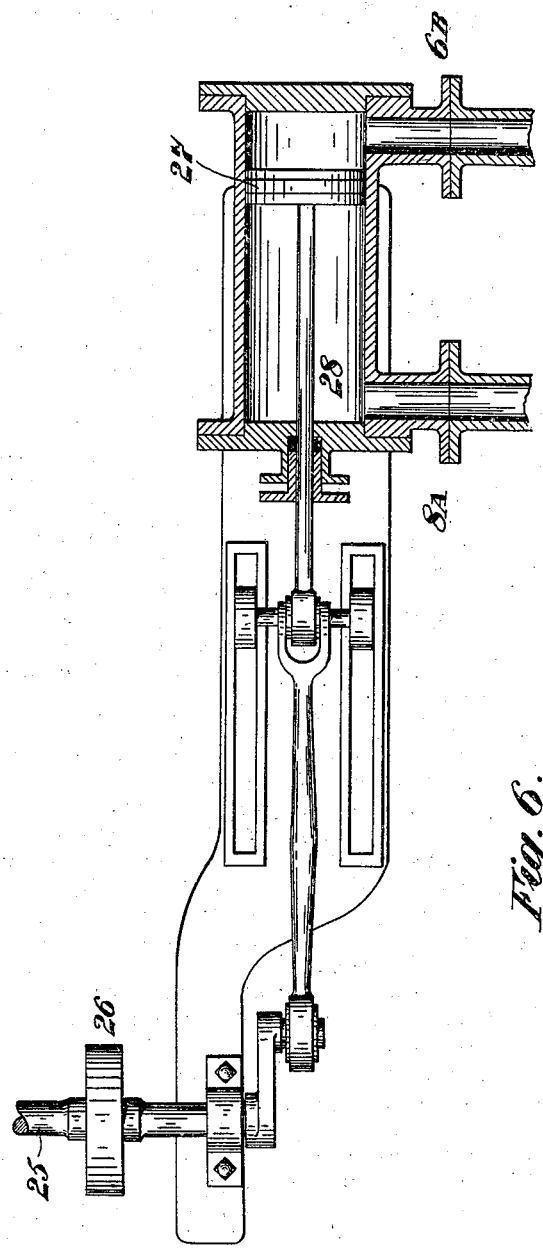

UNITED STATES PATENT OFFICE.

WILLIAM EVERITT, OF ILKLEY, AND THOMAS REDMAN, OF BOLTON, BRADFORD, ENGLAND.

APPARATUS FOR PURIFYING GAS.

SPECIFICATION forming part of Letters Patent No. 768,792, dated August 30, 1904.

Application filed December 9, 1903. Serial No. 184,478. (No model.)

*To all whom it may concern:*

Be it known that we, WILLIAM EVERITT, of the Gas Villa, Ilkley, and THOMAS REDMAN, of the Priory, Bolton, Bradford, in the county of York, England, subjects of the King of Great Britain and Ireland, have invented certain Improvements in and Relating to the Extraction of Tar and other Impurities from Illuminating-Gas, of which the following is a specification.

This invention has for its object the abstraction of impurities from crude gas by a combination of mechanical parts so arranged that fine particles of tar and other impurities combined therewith and floating in the crude gas may be extracted therefrom more effectually than hitherto by a series of movable collectors placed within a casement and so retained that the collecting mediums held at a distance from each other are capable of being withdrawn for examination and by our combination to be enabled to vary the velocity at which the current of crude gas is caused to flow against and through the collectors for extracting the impurities and keeping the apparatus in a working condition, the velocity at short intervals being higher than at other short periods of time in contradistinction to the crude gas being allowed to flow at its normal or undisturbed rate through the apparatus, and by these means to enable the tar and combined impurities deposited on the collectors to be to a great extent, if not entirely, cleared of such deposit automatically without having to remove the collectors from the casement.

In describing how our invention may be carried out reference is made to the accompanying drawings, in which—

Figure 1 represents an elevation of apparatus constructed in accordance with our invention, part of which is shown in section. Fig. 2 is a plan of same. Fig. 3 is a cross-section through line 3 3 of Fig. 1. Fig. 4 is an elevation of a valve-seating flange drawn to a larger scale, showing the perforations through said flange; and Fig. 5 is a similar view with swing-valve in position, covering some of the perforations, one of which is clear of the swing-valve and always uncovered. Fig. 6 is a plan view, partly in section, of a valveless cylinder or pump suitable for carrying out our invention.

In carrying out our object the tar-extracting apparatus may be fixed in any convenient position between the "foul-main" range of pipes and gas-purifiers, both of which are of the ordinary construction and form no part of our invention. The inlet branch 1 of the apparatus is connected by a suitable pipe to the foul-main range, a stop-valve of the ordinary construction intervening. The outlet branch 2 is connected by pipes to the gas-condensing stack. A stop-valve in this case also intervenes, so that for examination the apparatus may be entirely disconnected, in which case the crude gas would be conducted direct from the foul-main range of pipes to the condenser-stack, as is now the common practice, suitable valves being introduced for the purpose of forming a by-pass of the ordinary type.

Within each casement 3 a number of disk rings or plates 4 are inserted, the center opening through each plate being filled or covered by a fine perforated screen 5, such as a finely-meshed wire-gauze, through which the crude gas is made to flow at irregular velocities in the direction toward the outlet branch 2; but at intervals gas is extracted from the purifying apparatus by a valveless cylinder or pump of suitable capacity and when reinjected into the apparatus is made to flow through the screens 5 during a short interval of time at a high velocity, and at alternate periods gas is extracted from another portion of the apparatus, which when reinjected is made to flow at a high velocity and impinge on the opposite sides of screens 5 in the following manner, the gas finally escaping through branch 2:

At each end of the apparatus is a branch 6, communicating with the interior. These branches are connected together by a pipe 7, provided with a branch 8, connected by a pipe to one end of before-mentioned cylinder, constructed in a well-known manner like the cylinder of an ordinary steam-engine, but without any valve, so that an open thoroughfare through the pipe is maintained between the branches 6 and one end of cylinder, which is provided with a reciprocating piston of similar construction to that of a steam-engine. In Fig. 6 is shown the valveless cylinder.

The crank-shaft 25 may be rotated in any convenient manner, such as by a strap traveling around in tight contact with pulley 26, secured on said shaft, thereby causing the piston 27 to reciprocate in a well-known manner in cylinder 28. The branch $8^A$ at one end of cylinder is connected to branch 8 by a pipe through which there is an open passage without valve, the branch $6^B$ at opposite end of cylinder being connected by a similar pipe to branch $6^A$, so that, as will be obvious, each side of piston 27 on reciprocation will extract gas from and reinject same into the interior of apparatus from which it was extracted.

The center compartment C of apparatus is connected by a branch $6^A$ to the opposite end of valveless cylinder by a pipe through which there is an open passage without valve, so that on the reciprocation of piston gas is alternately extracted from the ends through branches 6 and from the center of apparatus through branch $6^A$ and forced back into the respective cavities or compartments through opening 11 in each valve-plate at a high velocity and pressure, as and for the purpose as hereinafter described.

In the interior, near to each branch 6, is a valve-plate 10, through which perforations 11 and 12 are formed. The latter perforations are covered with a valve-plate 13, swinging on a pin, as clearly shown, so that on the reciprocating piston receding from one end of cylinder gas is drawn from the cavities 14, one at each end of apparatus, through said perforations 11 and 12. The valve 13 swinging from its seat allows gas to be freely extracted from the respective cavities, and on the return stroke of piston each valve-plate 13 is pressed against its seat, as shown, and by the piston moving on its return at the same rate the gas is forced back into the apparatus, the whole extracted volumn passing through the respective perforations 11 at a high velocity into the cavities 14, against and through the wire-gauze or like fine-meshed screens 5, thus agitating the other gas in the cavities, causing it to impinge with force against and to pass through the screens, which minutely split up the current, causing the tar and the like to be deposited on the walls of said screens and casement, from which it falls and drains away from the respective casements 3 through openings 15 to store-tanks by sealed drain-pipes of the ordinary construction.

When the gas is made to flow through screens 5 in one direction only at a speed suitable for depositing tar and the like thereon, experience has shown that the fine openings through said screens are soon filled up with tar and other impurities, rendering the apparatus inoperative. In order to keep the screens workably clear of deposit, we connect to the branch pipe 9, placed near the center of apparatus, a valve-plate 10 and swing-valve 13, inclosed by a similar cover 16, provided with a branch $6^a$, connected, as before described, by a valveless pipe to the opposite end of cylinder to that of the branches 6, so that when the piston is moving in one direction gas is drawn into the cylinder from the center compartment C at a time when the opposite side of piston is forcing gas into the cavities 14 against and through screens 5 toward the center compartment C. This action is repeated alternately—that is to say, gas is passed rapidly through the screens 5 first in one direction, then in the other. The piston after extracting gas from compartment C on the return movement forces it back into said compartment and through screens 5 to the right and left of branch 9. Thus by these pulsations of current the gas is agitated and what may be termed "resieved" and made to flow through the screens at a varying velocity, some at intermittent intervals in the reverse direction to that of the natural flow toward the outlet branch 2. This high velocity of injected gas in addition to agitating that within the apparatus has the effect of removing from the screens any tar or other impurities deposited thereon by blowing same into the spaces 18 between said screens. The tar or the like descending or dropping therefrom to the bottom escapes through channels 19 to inclines 20, by which the deposits are collected and conveyed to an opening 15 at bottom of each casement 3, to which ordinary sealed drain-pipes are connected. As a further precaution against the liability of the openings through the gauze or like screens 5 becoming filled up with collected impurities, and thus rendering the apparatus inoperative, it may at times be essential that steam or other fluid under pressure be injected into the apparatus. This may be accomplished by a pipe 21, placed, by preference, at the inflowing end, as shown, and conducted internally toward the center of apparatus. The pipe 21 is provided with a stop-tap, and on opening same steam or other fluid is injected within the casement for a short period for the purpose of damping and assisting to clear deposit from the fine openings through screens 5.

Each cover 16 is provided with a conical-seated plug 22, held in position by cross-bar 23 and screw 24, on the removal of which the inclosed swing-valve 13 and perforation 11 may examined.

It will be obvious that although provision is only made for two sets of screens in the apparatus shown and described more screens of a like character may be introduced and the gas caused to flow at intermittent intervals at a high velocity through same and escape through the outlet branch of apparatus.

What we claim as our invention is—

1. In an apparatus for purifying gas, a chamber having screens, and means for intermittingly directing a forced current of gas of high velocity against said screens, substantially as described.

2. In an apparatus for purifying gas, a chamber or conduit having screens, a gas inlet to and outlet from said conduit or chamber, and means independent of said inlet and outlet for abstracting portions of gas from and injecting same into said conduit in intermittent currents at high velocity against and through said screens in alternate directions, substantially as described.

In witness whereof we have hereunto set our hands in the presence of two witnesses.

WILLIAM EVERITT.
THOMAS REDMAN.

Witnesses:
W. ILLINGWORTH,
E. B. HAMMOND.